US012395341B2

(12) United States Patent
Marson et al.

(10) Patent No.: US 12,395,341 B2
(45) Date of Patent: Aug. 19, 2025

(54) AUGMENTED ZERO-KNOWLEDGE PROOF WITH PRIVATE MEMBERSHIP TEST

(71) Applicant: NEC Laboratories Europe GmbH, Heidelberg (DE)

(72) Inventors: Giorgia Azzurra Marson, Heidelberg (DE); Wenting Li, Heidelberg (DE); Ghassan Karame, Bochum (DE)

(73) Assignee: NEC CORPORATION, Tokyo (JP)

( * ) Notice: Subject to any disclaimer, the term of this patent is extended or adjusted under 35 U.S.C. 154(b) by 301 days.

(21) Appl. No.: 18/177,134

(22) Filed: Mar. 2, 2023

(65) Prior Publication Data

US 2024/0129125 A1    Apr. 18, 2024

Related U.S. Application Data

(60) Provisional application No. 63/411,658, filed on Sep. 30, 2022.

(51) Int. Cl.
*H04L 9/32* (2006.01)
*H04L 9/06* (2006.01)

(52) U.S. Cl.
CPC .......... *H04L 9/3218* (2013.01); *H04L 9/0618* (2013.01); *H04L 9/0656* (2013.01)

(58) Field of Classification Search
CPC ... H04L 9/3218; H04L 9/0618; H04L 9/0656; H04L 9/008; H04L 9/3221; H04L 2209/42; H04L 2209/50
See application file for complete search history.

(56) References Cited

U.S. PATENT DOCUMENTS

| 2012/0023334 | A1* | 1/2012 | Brickell | H04L 9/3273 713/169 |
| 2021/0336789 | A1* | 10/2021 | Chalkias | H04L 9/3239 |
| 2024/0104234 | A1* | 3/2024 | Fox-Epstein | G06F 21/6245 |

OTHER PUBLICATIONS

Privacy-preserving Identity Management System, by Lee et al., published 2021 (Year: 2021).*
Jarecki, Stanisław et al.; "Efficient Oblivious Pseudorandom Function with Applications to Adaptive OT and Secure Computation of Set Intersection"; *2009 6th Theory of Cryptography Conference—Lecture Notes in Computer Science*; Feb. 20, 2009; pp. 577-594; vol. 5444; Springer-Verlag; Berlin/Heidelberg, Germany.
Benarroch, Daniel et al.; "Zero-Knowledge Proofs for Set Membership: Efficient, Succinct, Modular"; *25th International Conference Financial Cryptography and Data Security*; Mar. 1, 2021; pp. 393-414; ACM Publications; New York, NY, USA.

* cited by examiner

*Primary Examiner* — Vu V Tran
(74) *Attorney, Agent, or Firm* — Leydig, Voit & Mayer, Ltd.

(57) ABSTRACT

A method for performing a privacy-preserving membership test includes performing an oblivious pseudo-random function (OPRF) protocol to determine a pseudo-random function (PRF) result based on an input from a proving device and a PRF key. The input indicates a user identity of a user associated with the providing device. The method further includes determining whether the user belongs to a verifier list associated with a verifier device based on testing membership of the user using the verifier list and the PRF result.

15 Claims, 7 Drawing Sheets

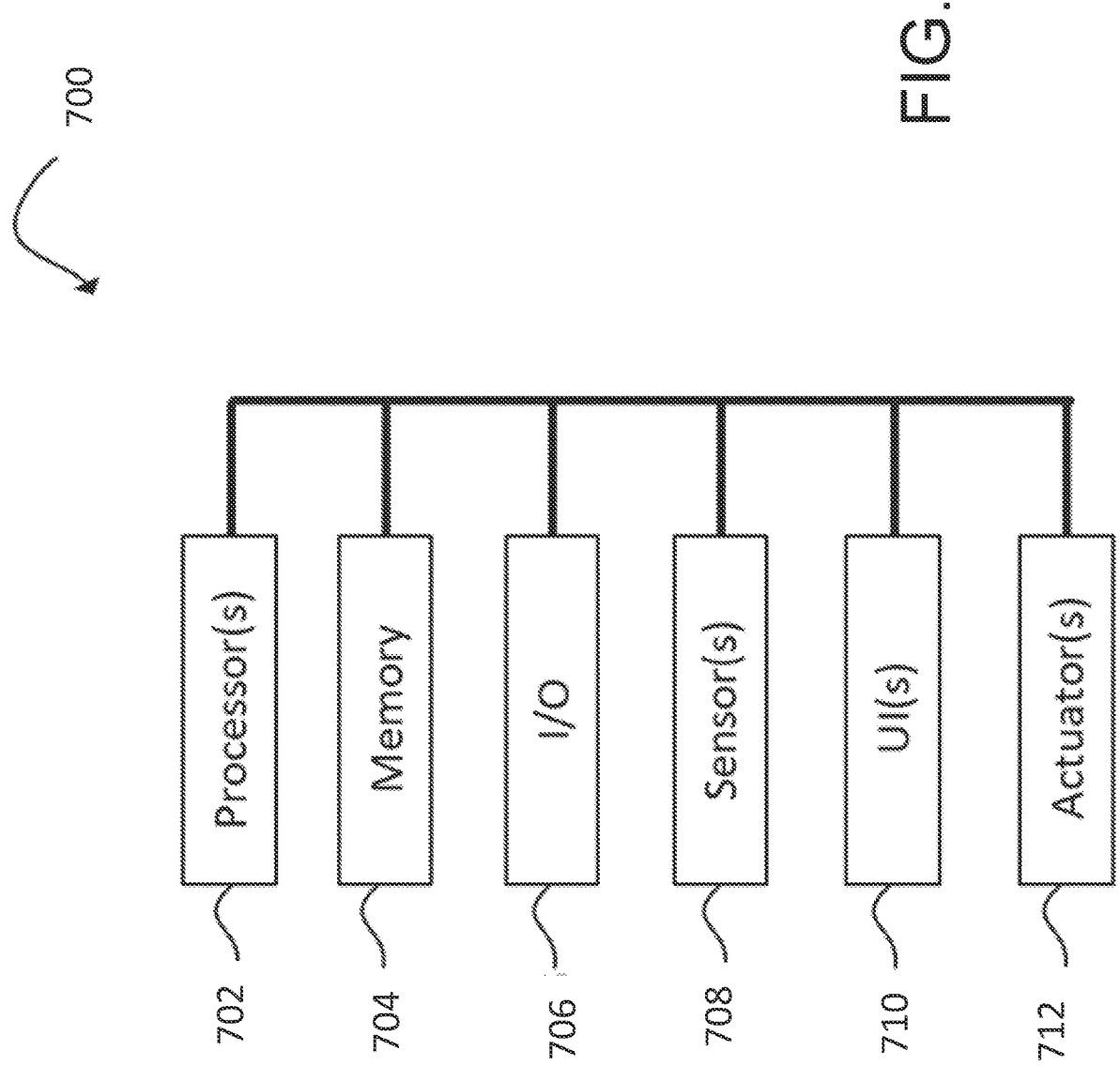

AUGMENTED ZERO-KNOWLEDGE PROOF WITH PRIVATE MEMBERSHIP TEST

CROSS-REFERENCE TO PRIOR APPLICATION

Priority is claimed to U.S. Provisional Application No. 63/411,658, filed on Sep. 30, 2022, the entire contents of which is hereby incorporated by reference herein.

FIELD

The present disclosure relates to a method, system, and computer-readable medium for an augmented zero-knowledge proof with private membership test.

BACKGROUND

A self-sovereign identity (SSI) system enables individuals to own and control their own identities and credentials in a decentralized manner. In these systems, user authentication is performed peer-to-peer between end users and verifiers, instead of relying solely on the service of credential issuers. This approach greatly enhances the privacy of users: not only can users decide what credentials to reveal to the verifier, they are also guaranteed that issuers cannot track their activities.

To concretely improve the privacy-preserving experience of users, which is one of the most relevant desiderata of SSI, efforts have been made to apply anonymous credentials to verifiable credentials. More specifically, anonymous credentials leverage zero-knowledge proofs (ZKP) protocols to enable users to prove possession of a valid credential, or selectively disclose the properties of their credential attributes, without revealing the credential itself.

While ZKP protocols guarantee user privacy during the user-authentication process, the privacy requirements of verifiers are often neglected. Among these requirements, private sanction-blacklist/whitelist matching is the most common use case that requires verifier privacy, which is difficult to perform using standard ZKP protocols.

In current realizations of user-authentication/authorization, the verifier's list is kept secret by the verifier, as it concerns the privacy of verifiers. Namely, the user presents their identity to the verifier, and the verifier locally checks the presented identity against its check list.

However, with anonymous credentials, users no longer share their credentials with the verifier: they only provide a cryptographic proof about their credentials possessing certain attributes, preventing verifiers from comparing user identities against their check list. Existing solutions for testing membership of anonymous credentials with respect to a verifier's check list require verifiers to disclose their check list (or at least some information about the lists), so that users are able to generate corresponding ZKP proofs to prove that they are not blacklisted or they are in the whitelist. Yet, such solutions are suitable only for use cases where no privacy is required for the verifier's check list, for example, the verifier applies membership test to check whether the user is from a European Union (EU) country. In fact, the state of the art only applies zero-knowledge membership tests on public sets. See, e.g., Benarroch, et al., "Zero-Knowledge Proofs for Set Membership: Efficient, Succinct, Modular", International Conference on Financial Cryptography and Data Security," In: Borisov, N., Diaz, C. (eds) Financial Cryptography and Data Security. FC 2021. Lecture Notes in Computer Science, vol 12674, pp. 393-414 (2021 Germany), the entire contents of which, are hereby incorporated by reference herein. However, there is currently no solution for privacy-preserving membership test on a private set that can be used to ensure the privacy of both the user and the verifier during the user authentication and authorization process.

SUMMARY

In an embodiment, the present disclosure provides a method for performing a privacy-preserving membership test. An oblivious pseudo-random function (OPRF) protocol is performed to determine a pseudo-random function (PRF) result based on an input from a proving device and a PRF key. The input indicates a user identity of a user associated with the providing device. The method further includes determining whether the user belongs to a verifier list associated with a verifier device based on testing membership of the user using the verifier list and the PRF result.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 7 is a block diagram of an exemplary processing system, which can be configured to perform any and all operations disclosed herein.

DETAILED DESCRIPTION

Figure 1:
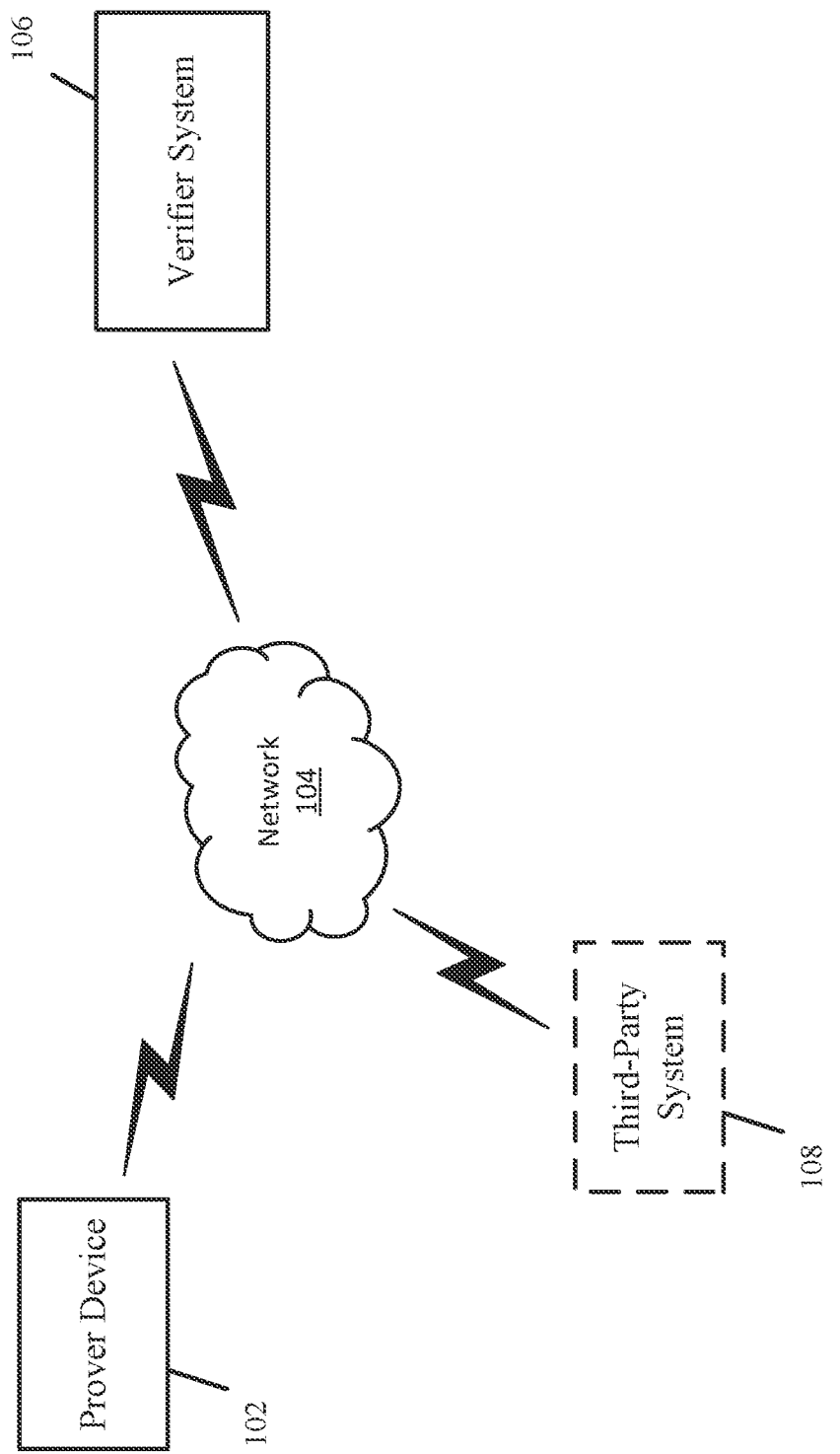
FIG. 1 illustrates a simplified block diagram depicting an exemplary computing environment according to an embodiment of the present disclosure.

Aspects of the present disclosure provide a method to enhance an anonymous credential system with a privacy-preserving membership test. For instance, the method performs a privacy-preserving membership test between a Prover and a Verifier, and allows the Verifier to determine (e.g., learn) whether a credential holder's identity belongs to a verifier-held list without the need to disclose the user's identity to the Verifier and/or the Verifier's list to the credential holder. By performing the method, Verifiers are provided stronger privacy guarantees, which enhances anonymous credential systems.

According to an aspect of the present disclosure, a method is provided that performs a privacy-preserving membership test in combination with anonymous credential verification. For instance, the method performs a privacy-preserving membership test, on a private set, for the identity associated to a verifiable anonymous credential. The method enables a Verifier to check whether a user (e.g., the Prover) participating in the authentication/authorization process belongs to the verifier's list while keeping the list private.

Aspects of the present disclosure can be performed in several user-authentication/authorization applications. For instance, authorities and/or corporations (e.g., the Verifiers) may seek to screen users against their lists (e.g., blacklists and/or whitelists). Some relevant uses for the present invention may include, but are not limited to:

During the check-in process with airlines, airline companies can have a "no-fly" list for unwelcoming customers.

In many countries, in addition to an "unwelcoming-list", casinos also have "self-exclusion" program that restricts the admission of certain customers.

Border control police screens the passengers and vehicles according to a "watchlist".

Airlines or hotels check if the check-in guest is in their "VIP list" without leaking their VIP list to the users.

According to a first aspect, the present disclosure provides a method for performing a privacy-preserving membership test. An oblivious pseudo-random function (OPRF) protocol is performed to determine a pseudo-random function (PRF) result based on an input from a proving device and a PRF key. The input indicates a user identity of a user associated with the providing device. The method further includes determining whether the user belongs to a verifier list associated with a verifier device based on testing membership of the user using the verifier list and the PRF result.

According to a second aspect, the method according to the first aspect further comprises a list associated with a company is indicated by the verifier list, and the method further comprises that determining whether the user belongs to the verifier list comprises determining whether the user belongs to the list.

According to a third aspect, the method according to the first or the second aspect further comprises performing a PRF evaluation on individuals indicated by the verifier list using the PRF key to determine a representation of the verifier list indicating a plurality of pseudo-random values, and the method further comprises that determining whether the user belongs to the verifier list comprises testing the membership of the user based on comparing the PRF result with the plurality of pseudo-random values indicated by the representation of the verifier list.

According to a fourth aspect, the method according to any of the first to third aspects further comprises that the PRF key is a verifier-held key that is stored in the verifier device, and the method further comprises that performing the PRF on individuals comprises performing, by the verifier device, the PRF on individuals indicated by the verifier list using the PRF key to determine the representation of the verifier list indicating the plurality of pseudo-random values.

According to a fifth aspect, the method according to any of the first to third aspects further comprises that the PRF key is a server-held key that is stored in a third-party server that is separate from the verifier device and the proving device, and the method further comprises that performing the PRF on individuals comprises performing a second PRF evaluation on the individuals indicated by the verifier list using the server-held key to determine the plurality of pseudo-random values indicated by the representation of the verifier list.

According to a sixth aspect, the method according to any of the first, second, third, and fifth aspects further comprises that performing the OPRF protocol to determine the PRF result comprises obtaining, from the prover device, the PRF result and a commitment associated with the prover device, the method further comprises that the PRF result is based on the server-held key, and the method further comprises that determining whether the user belongs to the verifier list comprises performing a membership check based on comparing the PRF results received from the prover device and the plurality of pseudo-random values indicated by the representation of the verifier list.

According to a seventh aspect, the method according to any of the first to sixth aspects further comprises obtaining a zero-knowledge proof of possession of credentials for the input from the proving device based on determining that the user belongs to the verifier list, and verifying the zero-knowledge proof.

According to an eighth aspect, the method according to any of the first to seventh aspects further comprises that performing the OPRF protocol to determine the PRF result based on the input from the proving device and the PRF key comprises obtaining, from the prover device, the input and a zero-knowledge proof of the input, verifying correctness of the zero-knowledge proof of the input from the prover device, and determining the PRF result based on the input and the verification. The method further comprises that the input is a first ciphertext that is based on homomorphically encrypting credentials of the user.

According to an ninth aspect, the method according to any of the first to eighth aspects further comprises that performing the OPRF to determine the PRF result based on the input from the proving device and the PRF key further comprises encrypting the PRF key using a public key of the prover device to determine the encrypted PRF key based on verifying the correctness of the zero-knowledge proof, and generating a second ciphertext based on the encrypted PRF key, the first ciphertext, and a randomly chosen blinding value. The method further comprises that determining the PRF result is based on the second ciphertext.

According to a tenth aspect, the method according to any of the first to ninth aspects further comprises that generating the second ciphertext comprises multiplying the encrypted PRF key with the first ciphertext to determine an intermediate ciphertext, and blinding the intermediate ciphertext with the randomly chosen blinding value to generate the second ciphertext.

According to an eleventh aspect, the method according to any of the first to tenth aspects further comprises that performing the OPRF protocol to determine the PRF result based on the input from the proving device and the PRF key further comprises obtaining, from the prover device, a partial PRF result and a zero-knowledge proof of the partial PRF result, and verifying the zero-knowledge proof of the partial PRF result. The method further comprises that the partial PRF result is based on decrypting the second ciphertext and hiding the decrypted second ciphertext by moving the decrypted second ciphertext into an exponent of the partial PRF result. The method further comprises that determining the PRF result is based on verifying the zero-knowledge proof of the partial PRF result.

According to a twelfth aspect, the method according to any of the first to eleventh aspects further comprises that determining the PRF result comprises generating the PRF result based on removing the randomly chosen blinding value from the exponent of the partial PRF result.

According to a thirteenth aspect of the present disclosure, a system for performing a privacy-preserving membership test is provided, the system comprising one or more hardware processors, which, alone or in combination, are configured to provide for execution of the following steps: performing an oblivious pseudo-random function (OPRF) protocol to determine a PRF result based on an input from a proving device and a PRF key, wherein the input indicates a user identity of a user associated with the proving device; and determining whether the user belongs to a verifier list associated with a verifier device based on testing membership of the user using the verifier list and the PRF result.

According to a fourteenth aspect, the system according to the thirteenth aspect further performs a PRF evaluation on individuals indicated by the verifier list using the PRF key to determine a representation of the verifier list indicating a plurality of pseudo-random values, and the system further determines whether the user belongs to the verifier list by testing the membership of the user based on comparing the PRF result with the plurality of pseudo-random values indicated by the representation of the verifier list.

A fifteenth aspect of the present disclosure provides a tangible, non-transitory computer-readable medium having instructions thereon, which, upon being executed by one or more processors, provides for execution of the method according to any of the first to the twelfth aspects.

For illustration of aspects of the present disclosure, a non-limiting example of an anonymous credential scenario involving a Prover and a Verifier is considered. For instance, a Prover (e.g., a user) wishes to authenticate to a Verifier (e.g., an authority or corporation) by proving possession of valid credentials in a privacy-preserving manner. A mechanism implemented according to an aspect of the present disclosure augments and enhances an anonymous credential system by enabling a private membership test allowing the Verifier to check whether the Prover's identity belongs to a checklist held by the Verifier. The membership test is private in the sense that the Prover's identity is not disclosed to the Verifier, and similarly, the Verifier's checklist is not disclosed to the Prover.

Figure 2:
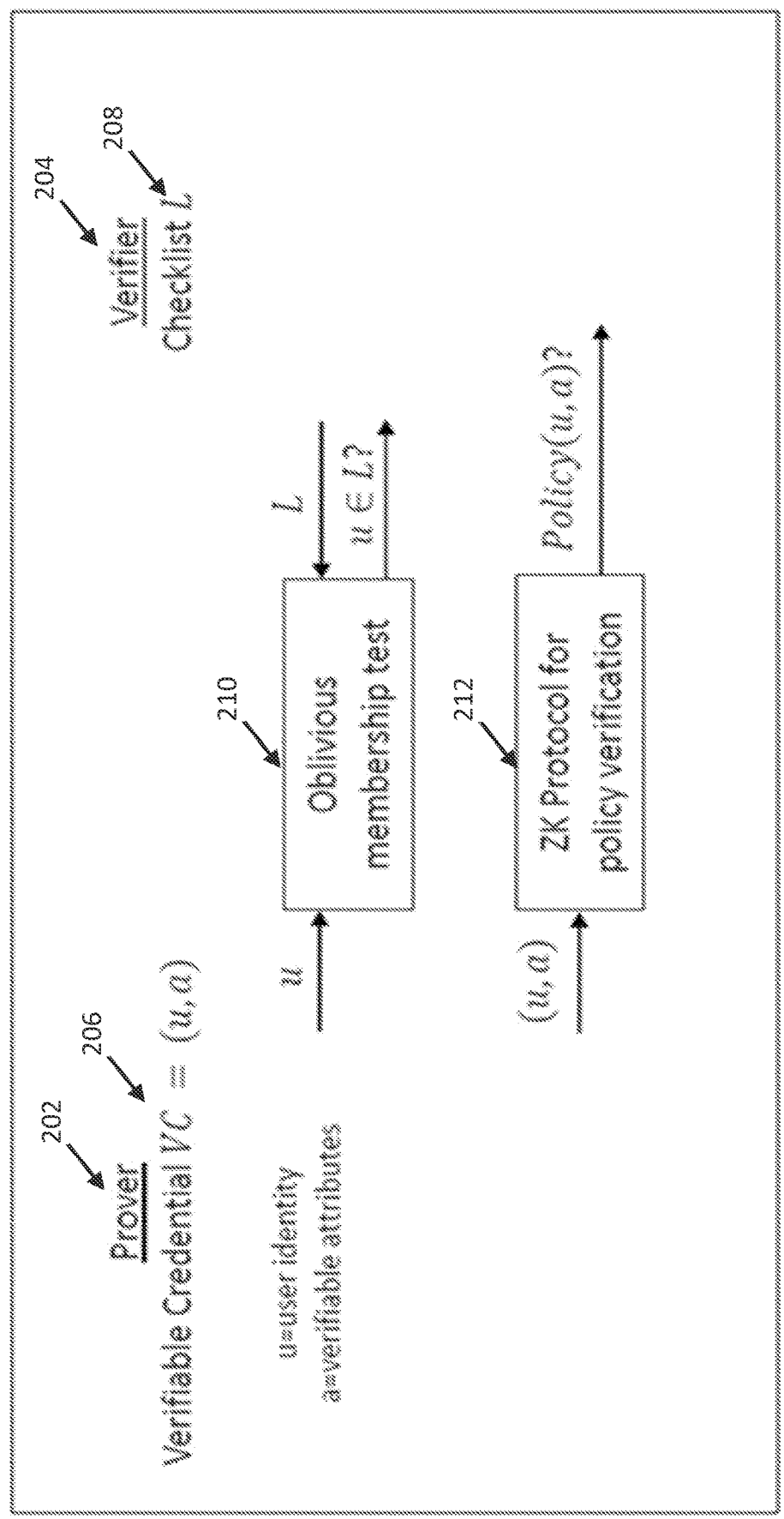
FIG. 2 illustrates a privacy-preserving set membership combined with anonymous credential verification according to an embodiment of the present disclosure.

FIG. 1 illustrates a simplified block diagram depicting an exemplary computing environment according to an embodiment of the present disclosure. FIG. 2 illustrates a privacy-preserving set membership combined with anonymous credential verification according to an embodiment of the present disclosure. For instance, FIG. 1 illustrates an exemplary computing environment that can perform the aforementioned scenario or embodiments and/or additional or alternative scenarios or embodiments. FIG. 2 provides a high-level illustration of performing the aforementioned scenario or embodiment.

Referring to FIG. 1, the environment 100 includes a prover device 102 (e.g., a user device), a network 104, a verifier system 106, and a third-party server 108. Although certain entities within environment 100 are described below and/or depicted in the FIGURES as being singular entities, it will be appreciated that the entities and functionalities discussed herein can be implemented by and/or include one or more entities.

The entities within the environment 100 are in communication with other devices and/or systems within the environment 100 via the network 104. The network 104 can be a global area network (GAN) such as the Internet, a wide area network (WAN), a local area network (LAN), or any other type of network or combination of networks. The network 104 can provide a wireline, wireless, or a combination of wireline and wireless communication between the entities within the environment 100.

The prover device 102 is a computing device that is operated by a user. For instance, the prover device 102 is associated with a Prover (e.g., a user or client) that seeks to authenticate their identity or another individual's identity with a Verifier. In some instances, as mentioned above, aspects of the present disclosure can be used to screen users against blacklists/whitelists. For example, during the check-in process for airlines or hotels, the user can use the prover device 102 to provide information to the verifier system 106 to authenticate their identity.

The prover device 102 is and/or includes, but is not limited to, a desktop, laptop, tablet, mobile device (e.g., smartphone device, or other mobile device), server, computing system and/or other types of computing entities that generally comprises one or more communication components, one or more processing components, and one or more memory components.

The verifier system 106 is a computing system that performs one or more functions described herein. For instance, the verifier system 106 is associated with a Verifier such as an authority (e.g., a government authority or entity) and/or corporation. The verifier system 106 is associated with (e.g., stores and/or retrieves) a list (e.g., a Verifier list) that indicates a list of individuals (e.g., users). In some variations, as mentioned above, aspects of the present disclosure can be used to screen users against a Verifier list such as a blacklist or whitelist. For example, the verifier system 106 can be associated with (e.g., owned, operated, and/or managed by) an airline or hotel company. The verifier system 106 includes a list of individuals or users that are part of a "no-fly" list or a "VIP list". The verifier system 106 checks to confirm whether the user (e.g., the user operating the prover device 102) is on the verifier list. In some examples, the verifier system 106 verifies whether the user operating the prover device 102 is on the list without the need to obtain the user's identity (e.g., the verify system 106 obtaining or identifying the identity of the user) and/or provide the verifier's list to the prover device 102, which allows the list to remain private.

The verifier system 106 includes and/or is implemented using one or more computing devices, computing platforms, cloud computing platforms, systems, servers, and/or other apparatuses. In some instances, the verifier system 106 can be implemented as engines, software functions, and/or applications. For example, the functionalities of the verifier system 106 can be implemented as software instructions stored in storage (e.g., memory) and executed by one or more processors.

The third-party system 108 is a computing system that performs one or more functions described herein. For instance, the third-party system 108 is associated with a third-party (e.g., a party that is separate from the Prover and the Verifier). The third-party system 108 is shown using a dotted box to indicate that the third-party system 108 is optional. When present, the third-party system 108 performs one or more functions described herein (e.g., described in FIG. 4 for aiding the oblivious membership test between the Prover and the Verifier in order to provide unlinkability of users).

The third-party system 108 includes and/or is implemented using one or more computing devices, computing platforms, cloud computing platforms, systems, servers, and/or other apparatuses. In some instances, the third-party system 108 can be implemented as engines, software functions, and/or applications. For example, the functionalities of the third-party system 108 can be implemented as software instructions stored in storage (e.g., memory) and executed by one or more processors.

Referring to FIG. 2, a high-level illustration 200 for privacy-preserving set membership is provided. For instance, a Prover 202 (e.g., the prover device 102 from FIG. 1) holding verifiable credentials 206 VC=(u, a) can authenticate to the Verifier 204 (e.g., the verifier device 106 from FIG. 1) by proving possession of verifiable credentials 206 that satisfy a certain public policy (e.g., validating a predicate Policy(u, a) where u denotes the user's identity and a denotes a set of verifiable attributes for identity u). Before proceeding to the authentication/authorization step (e.g., the ZK protocol for policy verification 212), the Verifier 204 performs a membership test 210 (e.g., an oblivious membership test) to check whether the user's identity u belongs to the Verifier's checklist L 208.

In some embodiments, the public policy can be a predicate that is known by all parties (e.g., "public" in the sense that it does not need to be kept private). For instance, a policy could be the person with the user identity ID is from a European Union (EU) country. Here, while the policy itself (e.g., being from an EU country) can be made public, the identity ID of the user is to be considered sensitive information, which is desired to be kept private. Formally, verifying a Policy can be defined as the process of evaluating a predicate over a (possibly private) input. Taking the same example as above, a verifiable attribute can be an attribute such as "being from an EU country" or "holding German citizenship". A verifiable attribute is one that can be verified by a designated party (e.g., a publicly verifiable attribute can be verified by anyone). For instance, presenting a valid passport issued from the German government would allow a person to prove, to a verifier 204, that they hold German citizenship/that they are from an EU country.

For instance, the Prover 202 can be the prover device 102. The prover device 102 can include memory that stores the verifiable credentials 206. In some instances, the prover device 102 receives (e.g., from the user and/or from another computing entity) the verifiable credentials 206. The verifiable credentials 206 indicate u, which denotes the user's identity, and a, which denotes a set of verifiable attributes for identity u. The Verifier 204 can be the verifier device 106. The verifier device 106 can include memory that stores the checklist 208.

At a first step, an oblivious membership test 210 is performed by the Prover 202, the Verifier 204, and/or another entity (e.g., the third-party system 108). For instance, the checklist 208 from the Verifier 204 and the user identity u from the verifiable credentials 206 are used for the oblivious membership test 210. The output from the oblivious membership test 210 indicates whether user's identity u belongs to the Verifier's checklist L 208 (e.g., u∈L or u belongs to the set L). Subsequently, the zero knowledge (ZK) protocol (e.g., a ZKP protocol) for policy verification 212 is performed by the Prover 202, the Verifier 204, and/or the other entity. For instance, the verifiable credentials 206 indicating the user identity and verifiable attributes are used to validate a predicate Policy(u, a). The ZK protocol for policy verification can be part of and/or be the authentication/authorization step described above.

In some instances, an aspect of the present disclosure configured to realize the aforementioned oblivious membership test leverages (e.g., uses) a pseudorandom function (PRF), which can be evaluated obliviously. This type of function is referred to herein as an oblivious PRF (OPRF). For instance, at the first step, the oblivious membership test 210 uses an OPRF to determine whether the user's identity belongs to (e.g., is part of) the Verifier's checklist 208.

An OPRF is an interactive protocol allowing two parties, A and B, to evaluate a PRF on an input x held by A and a key k held by B, in such a way that A learns the result $y = f_k(x)$, but learns nothing about the key, and B learns nothing. Below, party A is the "input holder" (e.g., the Prover 202), and party B is the "key holder" (e.g., the Verifier 204 and/or a third-party system).

A high-level idea implemented in aspects of the present disclosure is to apply the same pseudorandom transformation $f_k(\cdot)$ to the Prover-held input u and to the Verifier-held elements $x_i \in L$ (e.g., the elements or individuals $x_i$ that belongs to the checklist L 208), and then let the Verifier check membership of the pseudo-random value $y := f_k(u)$, derived from the Prover's identity u, with respect to the set of pseudo-random values $\{f_k(x_i)\}_{x_i \in L}$ derived from the members $x_i$ of the checklist L. This allows the Verifier 204 to check if the Prover's 202 identity belongs to the checklist without leaking such identity.

In the following, two non-limiting, exemplary embodiments implementing aspects of the present disclosure are described.

Embodiment #1

In the first embodiment, a mechanism (e.g., process and/or method) is implemented according to aspects of the present disclosure that realizes an oblivious membership test 210 by letting the Prover 202 and the Verifier 204 operate an OPRF protocol with an inverted outcome as the conventional OPRF to evaluate $f_k(u)$. Here, $f$ is an agreed-upon PRF (e.g., the PRF agreed-upon by the Prover 202 and the Verifier 204), k is a PRF key held by the Verifier 204, and u is an encoding of the Prover's identity from the verifiable credentials 206 to prevent the Verifier 204 from learning the identity of the user. The OPRF protocol is inverted as for a conventional OPRF, the Prover 202 (e.g., the input holder of u) receives an output. For the inverted OPRF protocol, the Verifier 204 receives the output. The protocol (e.g., the process or method) terminates or ends with the Prover 202 learning nothing and the Verifier 204 obtaining an output. The output includes a PRF value $y = f_k(u)$ as well as a commitment to the Prover's input c=com(u). The Verifier 204 uses the PRF key k to evaluate elements of the checklist L, obtaining a representation $Y = \{f_k(x_i) : x_i \in L\}$ of pseudo-random values derived from the members $x_i$, where each value $f_k(x_i)$ is the pseudo-random value associated to $x_i$ under key k. The Verifier 204 then checks if the user's input belongs to the list by testing whether the PRF value y belongs to the representation Y of the list (e.g., the blacklist). Additionally, and/or alternatively, the commitment c=com (u) allows to cryptographically bind the output y of the OPRF protocol to the credentials employed in the authentication protocol, thereby enforcing honest behavior of the Prover 202. The commitment c (e.g., a Pedersen commitment) is a cryptographic primitive that allows one to commit to a chosen value while keeping it hidden to others (e.g., a party cannot change the value or statement after they have committed to it).

Figure 3:
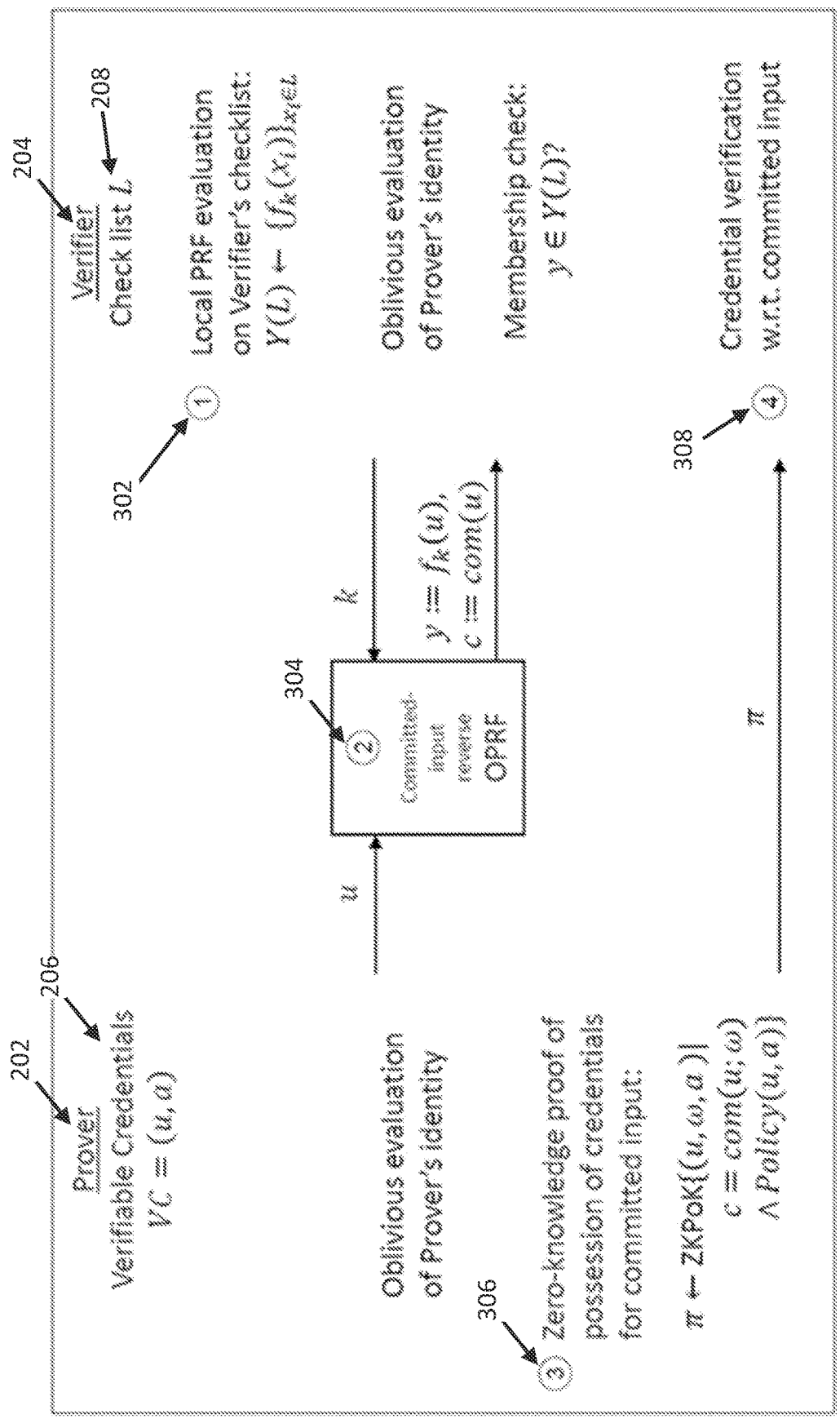
FIG. 3 illustrates a private set membership according to an embodiment of the present disclosure.

A method 300 according to the above-described embodiment, embedded with a ZK authentication system for anonymous credentials, is illustrated in FIG. 3. For instance, FIG. 3 illustrates a private set membership according to an embodiment of the present disclosure. The Prover 202 with the verifiable credentials 206 and the Verifier 204 with the check list 208 are shown.

At the first step 302, the Verifier 204 performs local PRF evaluation on the Verifier's checklist 208 to determine a representation of the checklist Y(L). For instance, the representation may be determined by: $Y(L) \leftarrow \{f_k(x_i)\}_{x_i \in L}$. For instance, the Verifier 204 determines the representation of the checklist based on the inverted OPRF protocol to evaluate function $f_k$, the PRF key k, and/or the checklist L. $x_i$ indicates the entries (e.g., users or individuals) within the checklist (e.g., $x_i \in L$).

At the second step 304, the Prover 202 and the Verifier 204 perform oblivious evaluation of the Prover's identity. For example, the Verifier 204 checks the membership of $y:=f_k(u)$, which is described above, and determines the commitment c=com(u). The Verifier 204 further checks whether the membership y belongs to the checklist representation Y(L) (e.g., $y \in Y(L)$, where y is determined based on the PRF $f_k(\bullet)$ and Y(L) is the representation of the checklist that is determined using the PRF key k at the first step 302). This is described in further detail below in FIG. 6.

At the third step 306, the Prover 202 performs the zero-knowledge proof (ZKP) of possession of the credentials for the committed input. For example, the Prover 202 determines the ZKP π based on:

$$\pi \leftarrow \text{ZKPoK}\{(u,\omega,a)|c=\text{com}(u;\omega) \wedge \text{Policy}(u,a)\}$$

where the ZKP π allows the Prover 202 to prove possession of an identity u, with attribute a, which fulfils a public policy Policy(u, a), as well as to prove knowledge of a value ω such that c is a commitment to the identity u under randomness ω. The ZKP π binds the input u, used by the Prover 202 as their identity in the membership test protocol, to the actual Prover's 202 identity.

The Prover 202 then provides the ZKP π to the Verifier 204. At the fourth step 308, the Verifier 204 performs credential verification with respect to (w.r.t.) the committed input.

The above-described OPRF protocol method 300 prevents the Verifier 204 from learning the identity u of the Prover 202. However, the Verifier 204 can detect whether the same user requests authentication/authorization multiple times, because the value y obliviously computed in the second step 304 is the same across all protocol executions involving the same user. This protocol is suitable for applications that do not require unlinkability of users (e.g., whether the same user executed the protocol or method 300 multiple times).

Embodiment #2

In the second embodiment, a mechanism is implemented according to an aspect of the present disclosure that leverages a third-party Server or system (e.g., the third-party system 108 shown in FIG. 1) to aid the oblivious membership test between Prover 202 and Verifier 204 in order to provide unlinkability of users. The third-party server acts as an intermediary between the Prover 202 and the Verifier 204, and is in charge of selecting the PRF key k for the oblivious evaluations of PRF values. The Verifier 204 interacts with the third-party server to obliviously compute $\{f_k(x_i):x_i \in L\}$ (e.g., the OPRF function described above $f_k$ for an input $x_i$ and whether the input belongs to the checklist L 208), and likewise the Prover 202 interacts with the third-party system to obliviously compute $f_k(u)$. The third-party system uses a uniformly chosen PRF key k for each protocol interaction. In this way, the third-party system can no longer link users by comparing values y across various interactions.

Figure 4:
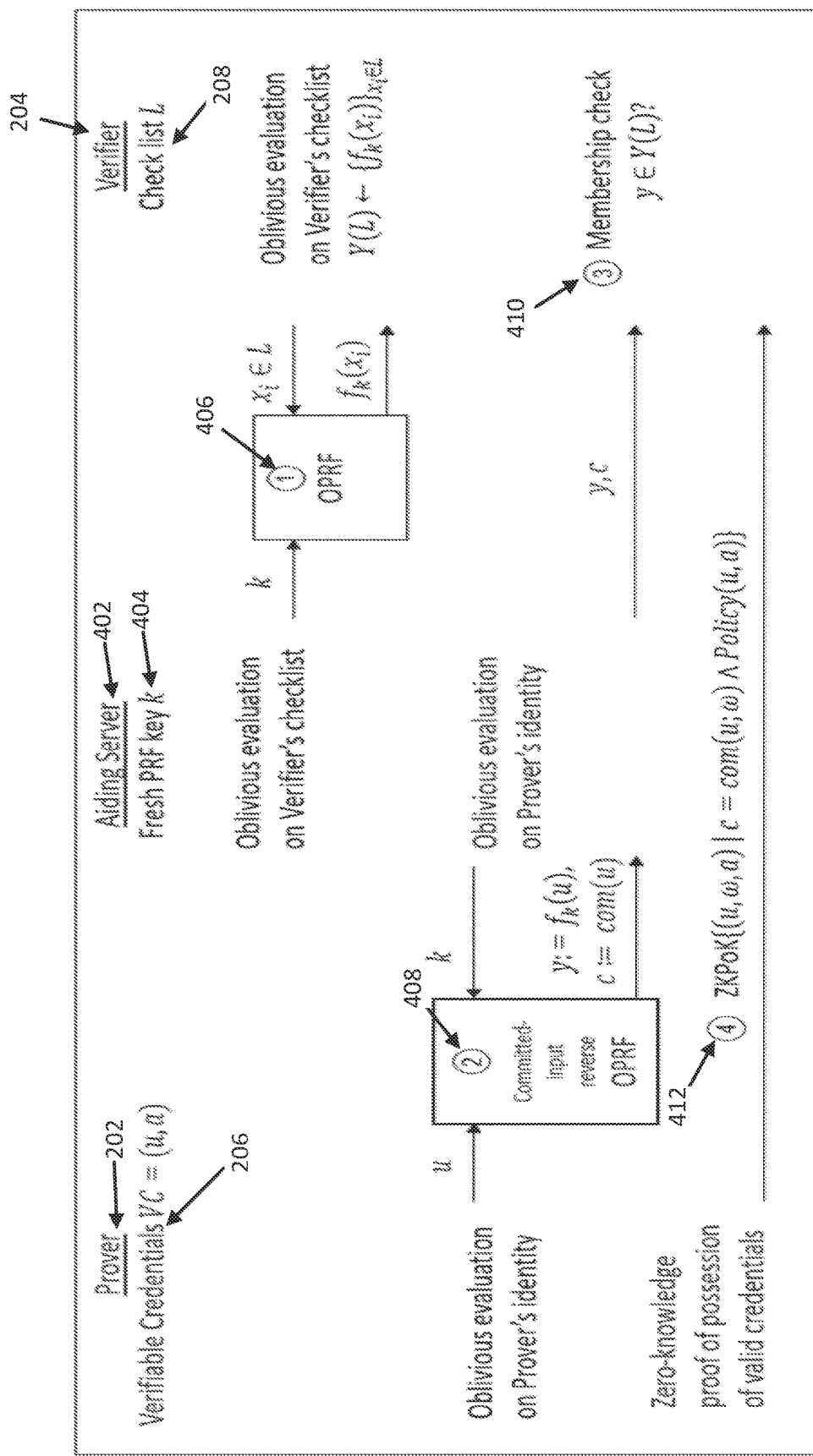
FIG. 4 illustrates a server-aided private and unlinkable membership test according to an embodiment of the present disclosure.

A method 400 according to the above-described embodiment, embedded with a ZK authentication system for anonymous credentials, is illustrated in FIG. 4. FIG. 4 illustrates a server-aided private and unlinkable membership test according to an embodiment of the present disclosure. For instance, FIG. 4 shows the Prover 202 with the verifiable credentials 206 and the Verifier 204 with the check list 208. Additionally, FIG. 4 shows the aiding server 402 (e.g., the third-party system 108 shown in FIG. 1), which includes and/or utilizes a fresh PRF key k 404.

At the first step 406, an oblivious evaluation on the verifier's checklist 208 is performed by the aiding server 402 and the verifier 204. For instance, the aiding server 402 and the verifier 204 determines the representation of the verifier's checklist Y(L) using a fresh PRF key k 404 (e.g., $Y(L) \leftarrow \{f_k(x_i)\}_{x_i \in L}$). For example, the first step 406 is similar to the first step 302 of FIG. 3 except the oblivious evaluation on the Verifier's checklist is performed by the aiding server 402 and the Verifier 204 rather than the Verifier 204 themselves. Further, the first step 406 uses the key k 404 that belongs to the aiding server 402 rather than the Verifier 204.

At the second step 408, an oblivious evaluation on the Prover's identity is performed by the Prover 202 and the aiding server 402. For example, the oblivious evaluation includes the Prover 202 and the aiding server 402 using the key 404 and the user input u indicating an encoding of the user's identity. Based on the oblivious evaluation on the Prover's identity, the result of the OPRF y (e.g., $y:=f_k(u)$) and the commitment c=com(u) are determined. The output y and the commitment c are provided by the aiding server 402 to the Verifier 204. For instance, the second step 408 is similar to the second step 304 of FIG. 3 except the oblivious evaluation on the Prover's identity is performed by the Prover 202 and the Aiding Server 402. Further, the second step 408 uses the key k 404 that belongs to the aiding server 402 rather than the Verifier 204.

At the third step 410, the Verifier 204 performs the membership check (e.g., $y \in Y(L)$). For instance, after receiving the result of the OPRF y, the Verifier 204 determines whether y belongs to the representation of the Verifier's checklist Y(L) that was determined at the first step 406. Based on the determination, the Verifier 204 determines whether the user belongs to the checklist L 208 (e.g., whether the user is on the "no-fly list" or "VIP list").

At the fourth step 412, a zero-knowledge proof of possession of valid credentials is performed by the Prover 202 and the Verifier 204 (e.g., ZKPoK{(u, ω, a)|c=com(u; ω)∧Policy(u, a)}. The fourth step 412 can function similarly to step 306 of FIG. 3. For instance, the ZPK allows the Prover 202 to prove possession of an identity u, with attribute a, which fulfils a public policy Policy(u, a), as well as to prove knowledge of a value ω such that c is a commitment to the identity u under randomness ω. The ZKP π binds the input u, used by the Prover 202 as their identity in the membership test protocol, to the actual Prover's 202 identity.

In some embodiments, state of the art designs for OPRF protocols are not suitable for the scenario considered in the present disclosure. In typical OPRF applications, it is the input-holder that obtains the protocol output (e.g., the result of the OPRF is obtained by the Prover 202), while the oblivious membership testing for the present disclosure requires the key-holder (e.g., the Verifier 204 in the first embodiment and the third-party or aiding server 402 in the second embodiment) to learn the output $f_k(u)$ along with a commitment com(u) to the Prover's identity.

Figure 5:
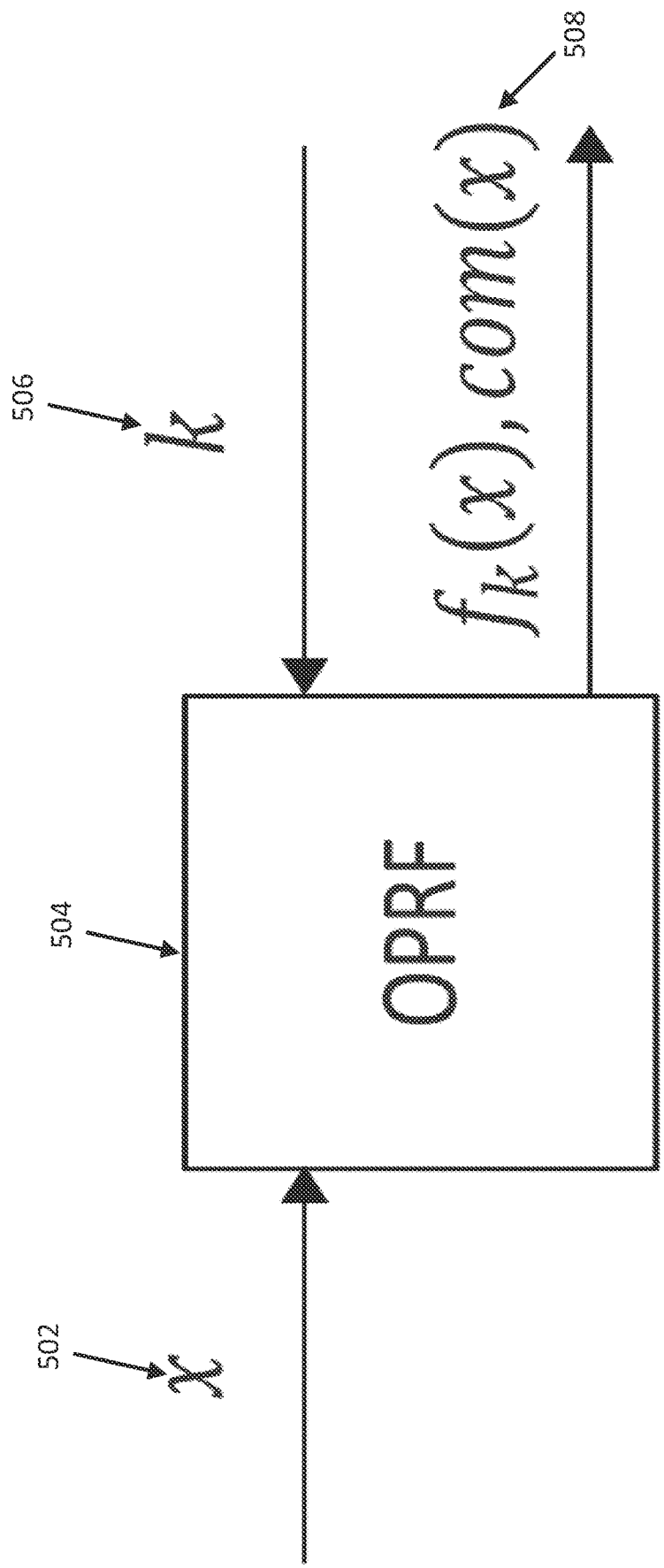
FIG. 5 illustrates an oblivious pseudorandom function functionality with committed input and reverse roles according to an embodiment of the present disclosure.

Aspects of the present disclosure rely on a new OPRF functionality with reverse roles (e.g., the input-holder learns nothing and the key-holders receive the output), which is disclosed by the present invention and described in further detail below. FIG. 5 illustrates an oblivious pseudorandom function functionality with committed input and reverse roles according to an embodiment of the present disclosure. For instance, FIG. 5 describes a realization of the modified OPRF functionality that is used in one or more embodiments of the present disclosure in further detail. For instance, the OPRF functionality 500 includes the OPRF function 504 (e.g., $f_k(x)$). An input x 502 and the key k 506 are provided to the OPRF function 504. The output 508 of the OPRF function 504 is $f_k(x)$ and a commitment com(x).

For instance, to realize the desired OPRF functionality, the present disclosure defines an adapted version of the protocol specified by Jarecki and Liu (Stanislaw Jarecki and Xiaomin Liu, "Efficient Oblivious Pseudorandom Function with Applications to Adaptive OT and Secure Computation of Set Intersection," TCC 2009: 577-594, the entire contents of which are hereby incorporated by references) for the evaluation of the Dodis-Yampolskiy PRF, defined by:

$$f_k(x) = \begin{cases} g^{\frac{1}{k+x}} & \text{if } gdc(x+k, n) \neq 1 \\ 1 & \text{otherwise}, \end{cases}$$

where gdc denotes the greatest common divisor, n is a safe Rivest-Shamir-Adleman (RSA) modulus, g is a group element of $\mathbb{Z}_n$, the set of integers modulo n, and the key k is a randomly chosen element in $\mathbb{Z}^*_n$. For example, referring to FIGS. 3 and 4, the OPRF protocol used in steps 302, 304, 406, and 408 can be the OPRF protocol described in FIG. 5. For instance, at step 304, the input u, which indicates the user's identity, is the input x shown in FIG. 5. Similarly, the key k from FIG. 3 is the key k shown in FIG. 5. Then, the output of the OPRF protocol 508 shown in FIG. 5 is a commitment and y, which is $y:=f_k(u)$ and described above.

Figure 6:
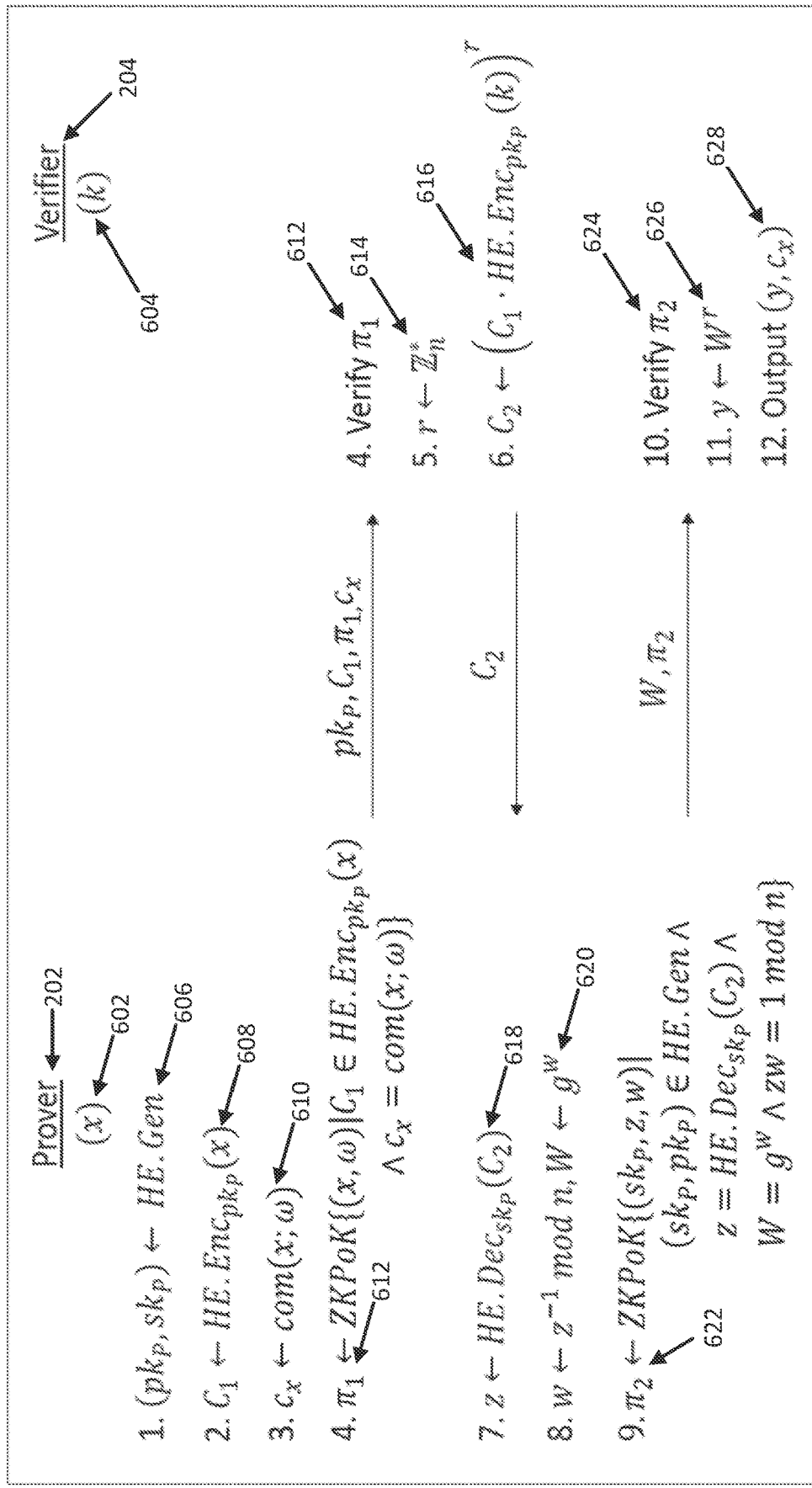
FIG. 6 illustrates an oblivious pseudorandom function evaluation with reverse roles according to an embodiment of the present disclosure.

The protocol (e.g., method 600) is depicted in FIG. 6, described below, and is used by the Prover 202 and the Verifier 204. FIG. 6 illustrates an oblivious pseudorandom function evaluation with reverse roles according to an embodiment of the present disclosure. For instance, the method 600 includes the input-holder that is the Prover 202 with the input x 602 and the key-holder that is the Verifier 204 with the key k 604. In some instances, the method 600 provides an instantiation of the abstract functionality described in FIG. 5. For instance, FIG. 5 specifies the input and expected output of each participant and method 600 describes concrete steps that allows the participants to derive the expected outputs. Method 600 can be part of methods 300 and 400 described above (e.g., a sub-component of the methods or protocols 300 and 400 described in FIGS. 3 and 4).

The protocol (e.g., method 600) uses the following two cryptographic schemes. The first scheme is an additively homomorphic encryption scheme HE with verifiable encryption and decryption. This can be instantiated using the Cramer-Shoup encryption scheme. The second scheme is a commitment scheme com that supports zero knowledge proofs of knowledge (ZKPoK) of committed values. This can be instantiated using Pedersen commitments.

The Prover 202 and the Verifier 204 share the following common inputs: a safe RSA modulus n and a group element g of a multiplicative group, such that ord(g)=n (e.g., the ordinal of the group element g returns the RSA modulus n).

The oblivious evaluation protocol 600 comprises the following steps. At a first set of steps 606-612, the Prover 202 generates a key pair ($pk_P$, $sk_P$) for an additively homomorphic encryption scheme, encrypts its input under $pk_P$ deriving ciphertext $C_1$, generates a commitment $c_x$ to the input, and generates a ZKP $\pi_1$ to prove knowledge of the input and that all values have been honestly generated. The Prover 202 sends $pk_P$, $C_1$, $c_x$, $\pi_1$ to the Verifier 204 and the Verifier 204 verifies the proof $\pi_1$.

For instance, as shown at step 606, the Prover 202 generates the key pair $pk_P$, $sk_P$ for an additively homomorphic encryption scheme HE such as the Cramer-Shoup encryption scheme. As such, the key pairs ($pk_P$, $sk_P$) are generated based on HE.Gen. At step 608, the Prover 202 encrypts its input x using its public key $pk_P$ to determine (e.g., generate) the ciphertext $C_1$. Therefore, the ciphertext $C_1$ is determined using an HE encryption based on the public key and input (e.g., $C_1 \leftarrow HE.Enc_{pk_P}(x)$). At step 610, the Prover 202 generates a commitment $c_x$ based on the input x and randomness $\omega$ (e.g., $c_x \leftarrow com(x; \omega)$). At step 612, the Prover 202 generates a ZKP $\pi_1$ to prove knowledge of the input. For instance, $\pi_1 \leftarrow ZKPoK\{(x, \omega)|C_1 \in HE.Enc_{pk_P}(x) \land c_x = com(x; \omega)\}$ provides a ZKP of knowledge of input x and randomness $\omega$ for the commitment. Then, the Prover 202 provides the public key $pk_P$, the ciphertext $C_1$, the commitment $c_x$, and the ZKP $\pi_1$ to the Verifier 204. The Verifier 204 verifies $\pi_1$. For instance, the Verifier 204 verifies $\pi_1$ based on the ZKP. For example, the Verifier 204 may use a function Verify($\pi_1$) that outputs "accept" or "reject" as a verdict on the correctness of the proof $\pi_1$.

At a second set of steps 614 and 616, after verifying the proof $\pi_1$, the Verifier 204 computes an encryption of its key under $pk_P$, multiplies the generated ciphertext with $C_1$, and blinds the resulting ciphertext by raising it to a randomly chosen exponent r. The Verifier 204 finally sends the aggregated and blind ciphertext $C_2$ to the Prover 202.

For instance, after verifying the proof $\pi_1$ at step 612, the Verifier 204 generates the ciphertext $C_2$ based on the received ciphertext $C_1$ from the Prover 202 and the encryption of its key k using the public key $pk_K$ from the Prover 202 (e.g., $HE.Enc_{pk_P}(k)$). For instance, the Verifier 204 multiples the received ciphertext with the encryption of its key under the public key, and blinds the resulting ciphertext by raising it to a randomly chosen exponent r (e.g., $(C_1 \cdot HE.Enc_{pk_P}(k))^r$) to determine the second ciphertext $C_2$. The Verifier 204 chooses the exponent r in $\mathbb{Z}^*_n$ by means of a uniformly random selection process. The Verifier 204 provides the second ciphertext $C_2$ to the Prover 202.

At the third set of steps 618-622, the Prover 202 decrypts $C_2$, computes $W=g^w$ where w is the inverse mod n of the decrypted value, and computes a ZKP $\pi_2$ to prove correct decryption and honest generation of W. The Prover 202 sends the group element W and the proof $\pi_2$ to the Verifier 204. For instance, in some examples, the Prover 202 decrypts the Verifier-provided ciphertext, hides the resulting plaintext by moving it to the exponent, and generates a zero-knowledge proof of the correctness of the computation.

For instance, the Prover 202 determines z, which is the decryption of the second ciphertext $C_2$. For example, at step 618, the Prover 202 determines z based on the decryption of $C_2$ using the secret key $sk_P$ (e.g., $z \leftarrow HE.Dec_{sk_P}(C_2)$). At step 620, the Prover 202 determines w based on an inverse modulus (mod) n (e.g., a safe RSA modulus) and z, which is the decryption of $C_2$ using the secret key $sk_P$. For instance, the Prover 202 determines the inverse mod n of value z, i.e., $w \leftarrow z^{-1}$ mod n. Using the so-derived value w, the Prover 202 further computes $W=g^w$ by raising the public group element g to the exponent w, obtaining a new group element W. At step 622, the Prover 202 determines the proof $\pi_2$, which is sent to the Verifier 204 along with the group element W. For instance, the Prover 202 determines the proof $\pi_2$ based on the secret key $sk_P$, the decryption of the second ciphertext z, and the group element w. For instance, the Prover 202 computes a ZKP $\pi_2 \leftarrow \text{ZKPoK}\{(sk_P, z, w)|(sk_P, pk_P) \in \text{HE.Gen} \wedge z = \text{HE.Dec}_{sk_P}(C_2) \wedge W = g^w \wedge zw = 1 \mod n\}$, which allows the Prover 202 to prove knowledge of the decryption key $sk_P$ associated to the public key $pk_P$, and knowledge of values z and w such that z is the decryption of ciphertext $C_2$ under key $sk_P$, w is the discrete logarithm of group element W, and z and w are inverse modulo n. After, the Prover 202 provides group element W and the proof $\pi_2$ to the Verifier 204.

At the fourth set of steps 624-628, after verifying the proof $\pi_2$, the Verifier 204 raises W to its own blinding exponent r obtaining $y = W^r$, and outputs the PRF value y and the previously obtained commitment $c_x$. For example, in some instances, the Verifier 204 verifies the correctness of the Prover-provided proof, removes the blinding value from the exponent of the partial PRF value provided by the prover, and returns the final PRF value and the Prover-provided commitment.

For instance, at step 624, the Verifier 204 obtains the proof $\pi_2$ and verifies the proof. At step 626, the Verifier 204 then determines y based on the group element W and the randomly chosen exponent r. For instance, y, which is the output of the PRF function described above, is determined based on $y \leftarrow W^r$. At step 628, the Verifier 204 outputs y and the previously obtained commitment $c_x$.

FIG. 7 is a block diagram of an exemplary processing system, which can be configured to perform any and all operations disclosed herein. For instance, a processing system 700 can include one or more processors 702, memory 704, one or more input/output devices 706, one or more sensors 708, one or more user interfaces 710, and one or more actuators 712. Processing system 700 can be representative of each computing system disclosed herein.

Processors 702 can include one or more distinct processors, each having one or more cores. Each of the distinct processors can have the same or different structure. Processors 702 can include one or more central processing units (CPUs), one or more graphics processing units (GPUs), circuitry (e.g., application specific integrated circuits (ASICs)), digital signal processors (DSPs), and the like. Processors 702 can be mounted to a common substrate or to multiple different substrates.

Processors 702 are configured to perform a certain function, method, or operation (e.g., are configured to provide for performance of a function, method, or operation) at least when one of the one or more of the distinct processors is capable of performing operations embodying the function, method, or operation. Processors 702 can perform operations embodying the function, method, or operation by, for example, executing code (e.g., interpreting scripts) stored on memory 704 and/or trafficking data through one or more ASICs. Processors 702, and thus processing system 700, can be configured to perform, automatically, any and all functions, methods, and operations disclosed herein. Therefore, processing system 700 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 900 can be configured to perform task "X". Processing system 700 is configured to perform a function, method, or operation at least when processors 702 are configured to do the same.

Memory 704 can include volatile memory, non-volatile memory, and any other medium capable of storing data. Each of the volatile memory, non-volatile memory, and any other type of memory can include multiple different memory devices, located at multiple distinct locations and each having a different structure. Memory 704 can include remotely hosted (e.g., cloud) storage.

Examples of memory 704 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 704.

Input-output devices 706 can include any component for trafficking data such as ports, antennas (i.e., transceivers), printed conductive paths, and the like. Input-output devices 706 can enable wired communication via USB®, Display-Port®, HDMI®, Ethernet, and the like. Input-output devices 706 can enable electronic, optical, magnetic, and holographic, communication with suitable memory 706. Input-output devices 706 can enable wireless communication via WiFi®, Bluetooth®, cellular (e.g., LTE®, CDMA®, GSM®, WiMax®, NFC®), GPS, and the like. Input-output devices 706 can include wired and/or wireless communication pathways.

Sensors 708 can capture physical measurements of environment and report the same to processors 702. User interface 710 can include displays, physical buttons, speakers, microphones, keyboards, and the like. Actuators 712 can enable processors 702 to control mechanical forces.

Processing system 700 can be distributed. For example, some components of processing system 700 can reside in a remote hosted network service (e.g., a cloud computing environment) while other components of processing system 700 can reside in a local computing system. Processing system 700 can have a modular design where certain modules include a plurality of the features/functions shown in FIG. 7. For example, I/O modules can include volatile memory and one or more processors. As another example, individual processor modules can include read-only-memory and/or local caches.

According to a first aspect of the present disclosure, a method is provided that provides the following. First, in some embodiments, aspects of the present disclosure construct in the Dodis-Yampolskiy pseudo-random function an oblivious PRF protocol with reversed roles by leveraging the symmetry between the key and inputs. Second, in some embodiments, aspects of the present disclosure leverage an intermediate server (e.g., the third-party system 108 and/or the aiding server 402) to provide unlinkability of users across different executions of a private membership test protocol. Third, in some embodiments, aspects of the present disclosure test private membership based on an oblivious PRF with reversed roles. For instance, aspects of the present disclosure test the private membership in such a way that the private identity is cryptographically bound to a verifiable anonymous credential.

According to a second aspect of the present disclosure, a method for an oblivious OPR protocol with reversed roles is provided. For instance, at a first step, the Prover (e.g., the Prover 202) homomorphically encrypts and commits to an input, and generates a zero-knowledge proof of knowledge of the input and correctness of the computation. At a second step, the Verifier (e.g., the Verifier 204) verifies the correctness of the Prover-provided proof, encrypts a PRF key, combines the ciphertext with the Prover-provided ciphertext and blinds the resulting ciphertext with a randomly chosen blinding value. At a third step, the Prover decrypts the Verifier-provided ciphertext, hides the resulting plaintext by moving it to the exponent, and generates a zero-knowledge proof of the correctness of the computation. At a fourth step, the Verifier verifies the correctness of the Prover-provided proof, removes the blinding value from the exponent of the partial PRF value provided by the prover, and returns the final PRF value and the Prover-provided commitment.

According to a third aspect of the present disclosure, a method for private set membership is provided (e.g., the first embodiment described above). For instance, at a first step, the Verifier locally evaluates a pseudo-random function on input the identities in the checklist and a Verifier-held key. At a second step, the Prover and the Verifier obliviously evaluates a pseudo-random function on input the Prover's identity and the Verifier-held key, using a committed-input oblivious PRF protocol with reversed roles (e.g., the second aspect of the present disclosure). At a third step, the Verifier tests membership of the output obtained in the second step with respect to (w.r.t.) the pseudo-random values obtained in the first step. At a fourth step, the Prover generates a zero-knowledge proof of possession of credentials for the input committed to in the second step. At a fifth step, the Verifier verifies the proof obtained from the Prover in the fourth step.

According to a fourth aspect, a method for private set membership with unlinkability is provided using an aiding server (e.g., the second embodiment described above). For instance, at a first step, the Server and the Verifier obliviously evaluate a pseudo-random function on input the identities in the checklist and a Server-held key. At a second step, the Prover and the Server obliviously evaluate a pseudo-random function on input the Prover's identity and the Server-held key, using a committed-input OPRF protocol with reversed roles. At a third step, the Verifier tests membership of the output obtained in the second step with respect to (w.r.t.) the pseudorandom values obtained in the first step. At the fourth step, the Prover generates a zero-knowledge proof of possession of credentials for the input committed to in the second step. At the fifth step, the Verifier verifies the proof obtained from the Prover in the fourth step.

According to a fifth aspect, a method may be executed using any combination of steps listed above in conjunction with the first through fifth aspects.

According to a sixth aspect of the present disclosure, a non-transitory computer readable medium is provided, having stored there on instructions for performing a method according to at least one of the first through fifth aspects when executed by one or more processors/computers.

According to a seventh aspect, a device is provided comprising pressing circuitry (e.g., a central processing unit coupled to memory), which is configured to execute a method according to at least one of the first through fifth aspects.

In some embodiments, the OPRF protocol (e.g., the protocol described above such as methods 300, 400, and/or 600) is an interactive protocol between two participants that allows a prover and a verifier to perform an oblivious evaluation of a pseudo-random function, obtaining value $f_k(x)$, based on a prover-held input x and a verifier-held PRF key k. The PRF function is a function used by the OPRF protocol as described above. For instance, the OPRF denotes the interactive protocol. Other terms (e.g., PRF result y, PRF key k, PRF input x) refer to the PRF function.

The methods and methodologies provide technical advancements to the state of the art which enables membership tests on anonymous credentials with a private blacklist held by the Verifier. Thus the mechanisms provide privacy protection not offered in the state of the art. For example, all existing solutions require the Verifier to make the blacklist public. Accordingly, aspects of the present invention can be implemented to provide an enhanced SSI solution that provides privacy for corporations and authorities.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for performing a privacy-preserving membership test, comprising:
   performing an oblivious pseudo-random function (OPRF) protocol to determine a pseudo-random function (PRF) result based on an input from a proving device and a PRF key, wherein the input indicates a user identity of a user associated with the proving device; and
   determining whether the user belongs to a verifier list associated with a verifier device based on testing membership of the user using the verifier list and the PRF result.

2. The method of claim 1, wherein the verifier list indicates a list associated with a company, and
   wherein determining whether the user belongs to the verifier list comprises determining whether the user belongs to the list.

3. The method of claim 1, further comprising:
   performing a PRF evaluation on individuals indicated by the verifier list using the PRF key to determine a representation of the verifier list indicating a plurality of pseudo-random values, and
   wherein determining whether the user belongs to the verifier list comprises testing the membership of the user based on comparing the PRF result with the plurality of pseudo-random values indicated by the representation of the verifier list.

4. The method of claim 3, wherein the PRF key is a verifier-held key that is stored in the verifier device, and wherein performing the PRF on individuals comprises performing, by the verifier device, the PRF on individuals indicated by the verifier list using the PRF key to determine the representation of the verifier list indicating the plurality of pseudo-random values.

5. The method of claim 3, wherein the PRF key is a server-held key that is stored in a third-party server that is separate from the verifier device and the proving device, and wherein performing the PRF on individuals comprises:
performing a second PRF evaluation on the individuals indicated by the verifier list using the server-held key to determine the plurality of pseudo-random values indicated by the representation of the verifier list.

6. The method of claim 5, wherein performing the OPRF protocol to determine the PRF result comprises obtaining, by the verifier device and from the prover device, the PRF result and a commitment associated with the prover device, wherein the PRF result is based on the server-held key, and
wherein determining whether the user belongs to the verifier list comprises performing, by the verifier device, a membership check based on comparing the PRF results received from the prover device and the plurality of pseudo-random values indicated by the representation of the verifier list.

7. The method of claim 1, further comprising:
based on determining that the user belongs to the verifier list, obtaining, by the verifier device, a zero-knowledge proof of possession of credentials for the input from the proving device; and
verifying, by the verifier device, the zero-knowledge proof.

8. The method of claim 1, wherein performing the OPRF protocol to determine the PRF result based on the input from the proving device and the PRF key comprises:
obtaining, by the verifier device and from the prover device, the input and a zero-knowledge proof of the input, wherein the input is a first ciphertext that is based on homomorphically encrypting credentials of the user;
verifying, by the verifier device, correctness of the zero-knowledge proof of the input from the prover device; and
determining, by the verifier device, the PRF result based on the input and the verification.

9. The method of claim 8, wherein performing the OPRF to determine the PRF result based on the input from the proving device and the PRF key further comprises:
based on verifying the correctness of the zero-knowledge proof, encrypting the PRF key using a public key of the prover device to determine the encrypted PRF key;
generating a second ciphertext based on the encrypted PRF key, the first ciphertext, and a randomly chosen blinding value, and
wherein determining the PRF result is based on the second ciphertext.

10. The method of claim 9, wherein generating the second ciphertext comprises:
multiplying the encrypted PRF key with the first ciphertext to determine an intermediate ciphertext; and
blinding the intermediate ciphertext with the randomly chosen blinding value to generate the second ciphertext.

11. The method of claim 9, wherein performing the OPRF protocol to determine the PRF result based on the input from the proving device and the PRF key further comprises:
obtaining, by the verifier device and from the prover device, a partial PRF result and a zero-knowledge proof of the partial PRF result, wherein the partial PRF result is based on decrypting the second ciphertext and hiding the decrypted second ciphertext by moving the decrypted second ciphertext into an exponent of the partial PRF result; and
verifying the zero-knowledge proof of the partial PRF result,
wherein determining the PRF result is based on verifying the zero-knowledge proof of the partial PRF result.

12. The method of claim 11, wherein determining the PRF result comprises generating the PRF result based on removing the randomly chosen blinding value from the exponent of the partial PRF result.

13. A system for performing a privacy-preserving membership test, the system comprising one or more hardware processors, which, alone or in combination, are configured to provide for execution of the following steps:
performing an oblivious pseudo-random function (OPRF) protocol to determine a PRF result based on an input from a proving device and a PRF key, wherein the input indicates a user identity of a user associated with the proving device; and
determining whether the user belongs to a verifier list associated with a verifier device based on testing membership of the user using the verifier list and the PRF result.

14. The system of claim 13, wherein the one or more hardware processors, which, alone or in combination, are configured to further provide for execution of the following step:
performing a PRF evaluation on individuals indicated by the verifier list using the PRF key to determine a representation of the verifier list indicating a plurality of pseudo-random values, and
wherein determining whether the user belongs to the verifier list comprises testing the membership of the user based on comparing the PRF result with the plurality of pseudo-random values indicated by the representation of the verifier list.

15. A tangible, non-transitory computer-readable medium having instructions thereon which, upon being executed by one or more processors, alone or in combination, provide for execution of a method for secure aggregation using public randomness comprising the following steps:
performing an oblivious pseudo-random function (OPRF) protocol to determine a PRF result based on an input from a proving device and an PRF key, wherein the input indicates a user identity of a user associated with the proving device; and
determining whether the user belongs to a verifier list associated with a verifier device based on testing membership of the user using the verifier list and the PRF result.

* * * * *